United States Patent Office 3,031,568
Patented Apr. 24, 1962

3,031,568
PROCESS OF ARC WELDING COPPER
Harold Courtney Turner, Oldbury, England, assignor to Imperial Chemical Industries Limited, London, England, a corporation of Great Britain
No Drawing. Filed July 29, 1957, Ser. No. 674,613
Claims priority, application Great Britain Aug. 2, 1956
4 Claims. (Cl. 219—137)

This invention is concerned with processes for the welding of copper in the presence of an inert gas, such as, for example, agon-arc welding processes or in inert gas shielded-arc welding processes.

In the welding of copper by the argon-arc process, it is customary to utilise a filter rod comprising copper with 0.25% by weight of silicon and 0.25% by weight of manganese. The welded joint produced by such a filler rod is eminently satisfactory, but all the silicon and manganese is not used up for deoxidising, and the remaining parts go into solid solution with the copper and this reduces the electrical conductivity at the welded joint.

According to this invention, I provide a process for the welding of copper in the presence of an inert gas in which process there is employed a welding filler rod comprising copper with between 0.02% to 0.1% by weight of boron and unavoidable impurities.

Preferably the amount of boron is between 0.03 and 0.08%.

The filler rod may be produced by fusion casting, where amounts of boron up to 0.03% are added, or may be produced by mixing copper powder with boron powder, compacting to shape by means of pressure and then sintering.

We have found that when the copper filler rod includes 0.03% by weight of boron, the welded joint produced in a conventional argon-arc welding process has an electrical conductivity higher than that obtained with previously-used filler rods.

For instance, in welding high-conductivity copper by an argon-arc process and using a filler rod of copper, silicon and manganese, the electrical conductivity at the welded joint was between 60 to 85% I.A.C.S., depending on the degree of dilution of the filler rod material in the weld. With a filler rod employing 0.03% by weight of boron, the conductivity at the welded joint was between 90 to 95% I.A.C.S., depending on the degree of dilution of the filler rod material in the weld.

When the copper filler rod includes 0.08% by weight of boron the conductivity at a welded joint between two high-conductivity copper members was about 85% I.A.C.S., depending on the degree of dilution of the filler rod material in the weld. Thus, although the conductivity is reduced as compared with a filler rod incorporating 0.03% by weight of boron it is at least as good as that obtained by the use of previously-known filler rods.

Although the filler rod is particularly useful for the welding of high conductivity copper, it is also perfectly suitable for welding other types of copper.

I claim:
1. A process for the arc welding of copper in the presence of an inert gas, in which there is employed a welding filler rod consisting essentially of copper and about 0.02–0.1% by weight of boron.
2. A process as claimed in claim 1 in which the welding filler rod includes between substantially 0.03% and substantially 0.08% by weight of boron.
3. A process for the arc welding of copper in the presence of an inert gas, in which a welding filler rod consisting essentially of copper and substantially 0.03% by weight of boron is employed.
4. A process for the arc welding of copper in the presence of an inert gas, in which a welding filler rod consisting essentially of copper and about 0.08% by weight of boron is employed.

References Cited in the file of this patent

UNITED STATES PATENTS

| | | |
|---|---|---|
| 750,512 | Wherry | Jan. 26, 1904 |
| 1,169,536 | Gleason | Jan. 25, 1916 |
| 2,195,433 | Silliman | Apr. 2, 1940 |
| 2,479,311 | Christensen et al. | Aug. 16, 1949 |
| 2,583,163 | Wasserman | Jan. 22, 1952 |
| 2,797,300 | Hawthorne | June 25, 1957 |

FOREIGN PATENTS

| | | |
|---|---|---|
| 862,117 | France | Feb. 27, 1941 |
| 21,012 | Great Britain | of 1913 |
| 536,893 | Great Britain | May 30, 1941 |